(12) United States Patent
Tanaka

(10) Patent No.: US 7,542,115 B2  
(45) Date of Patent: Jun. 2, 2009

(54) SEMI-TRANSMISSIVE LIQUID CRYSTAL DISPLAY PANEL

(75) Inventor: Shinichiro Tanaka, Tottori (JP)

(73) Assignee: Epson Imaging Devices Corporation, Nagano (JP)

( * ) Notice: Subject to any disclaimer, the term of this patent is extended or adjusted under 35 U.S.C. 154(b) by 279 days.

(21) Appl. No.: 11/529,264

(22) Filed: Sep. 29, 2006

(65) Prior Publication Data

US 2007/0076147 A1    Apr. 5, 2007

(30) Foreign Application Priority Data

Sep. 30, 2005   (JP)   ............................. 2005-286279

(51) Int. Cl.
   *G02F 1/1335*   (2006.01)
(52) U.S. Cl. ........................ 349/114; 349/130
(58) Field of Classification Search .................. 349/113, 349/114, 123, 134
   See application file for complete search history.

(56) References Cited

U.S. PATENT DOCUMENTS

| | | | |
|---|---|---|---|
| 2003/0081160 A1* | 5/2003 | Ihida et al. | 349/113 |
| 2004/0156004 A1* | 8/2004 | Shigeta et al. | 349/134 |
| 2004/0183970 A1* | 9/2004 | Niiya | 349/114 |
| 2006/0066790 A1* | 3/2006 | Tanaka et al. | 349/123 |
| 2006/0132684 A1* | 6/2006 | Tanaka | 349/114 |
| 2006/0274242 A1* | 12/2006 | Okumura | 349/114 |
| 2006/0290849 A1* | 12/2006 | Tanaka et al. | 349/114 |

FOREIGN PATENT DOCUMENTS

| | | |
|---|---|---|
| JP | 2003-167253 | 6/2003 |
| JP | 2004-69767 | 3/2004 |

* cited by examiner

*Primary Examiner*—Ellen Kim  
(74) *Attorney, Agent, or Firm*—McDermott Will & Emery LLP (57) ABSTRACT

An MVA semi-transmissive liquid crystal display panel is provided with: a first substrate divided into sections by signal lines and scan lines arranged so as to form a matrix, each section having a transmissive portion and a reflective portion, each section having a pixel electrode located in the transmissive portion or in the transmissive and reflective portions, each section having a reflecting layer located in the reflective portion; a second substrate having a common electrode formed on the surface thereof; a vertical alignment film laid on top of the first and second substrates; and a liquid crystal layer with negative dielectric anisotropy disposed between the first and second substrates. Here, the pixel electrode overlaps the scan lines in the transmissive portion, as seen in a plan view, and has jutting portions near where the signal lines and the scan lines intersect.

18 Claims, 9 Drawing Sheets

SEMI-TRANSMISSIVE LIQUID CRYSTAL DISPLAY PANEL

This application is based on Japanese Patent Application No. 2005-286279 filed on Sep. 30, 2005, the contents of which are hereby incorporated by reference.

BACKGROUND OF THE INVENTION

1. Field of the Invention

The present invention relates to a semi-transmissive liquid crystal display panel, and more particularly to a VA (vertically aligned) or MVA (multi-domain vertically aligned) semi-transmissive liquid crystal display panel that offers high aperture ratio and brightness, and that offers good contrast without sacrificing the image quality due to crosstalk or the like.

2. Description of Related Art

In recent years, it has been becoming increasingly popular to use liquid crystal display devices not only in information communication devices but also in commonly used electric devices. A liquid crystal display device itself does not emit light, and hence a transmissive liquid crystal display device provided with a backlight is widely used. Disadvantageously, the backlight consumes a large amount of electric power. It is for this reason that, to reduce the electric power consumption, portable devices in particular use a reflective liquid crystal display device that requires no backlight. The problem here is that this reflective liquid crystal display device uses external light as its light source, and hence suffers from poor visibility in a poorly-lit room, for example. It is under this background that semi-transmissive liquid crystal display devices that offer transmissive and reflective displays have been eagerly developed in recent years.

A liquid crystal display panel used in this semi-transmissive liquid crystal display device has pixel regions, each having a transmissive portion provided with a pixel electrode and a reflective portion provided with both a pixel electrode and a reflecting layer. In a poorly-lit place, this liquid crystal display panel displays an image by means of the transmissive portion of the pixel region by turning on the backlight; in a well-lit place, it displays an image by means of the reflective region illuminated by external light without turning on the backlight. This advantageously eliminates the need to keep the backlight on all the time, making it possible to greatly reduce the electric power consumption.

Now, since, for example, the users of mobile devices typified by mobile phones or the like are limited, there has conventionally not been so much demand to use a liquid crystal display panel having a wide viewing angle in small display portions of such mobile devices. However, with mobile devices becoming more and more sophisticated these days, there is a huge surge in demand for mobile devices having a display portion provided with a liquid crystal display panel having a wide viewing angle. To satisfy this demand, instead of TN (twisted nematic) liquid crystal display panels that have been conventionally frequently used in mobile devices, VA or MVA semi-transmissive liquid crystal display panels have come to be developed increasingly eagerly (see JP-A-2003-167253 (claims, paragraphs [0050] to [0057], FIG. 1) and JP-A-2004-069767 (claims, paragraphs [0044] to [0053], FIG. 1)).

Figure 4A:
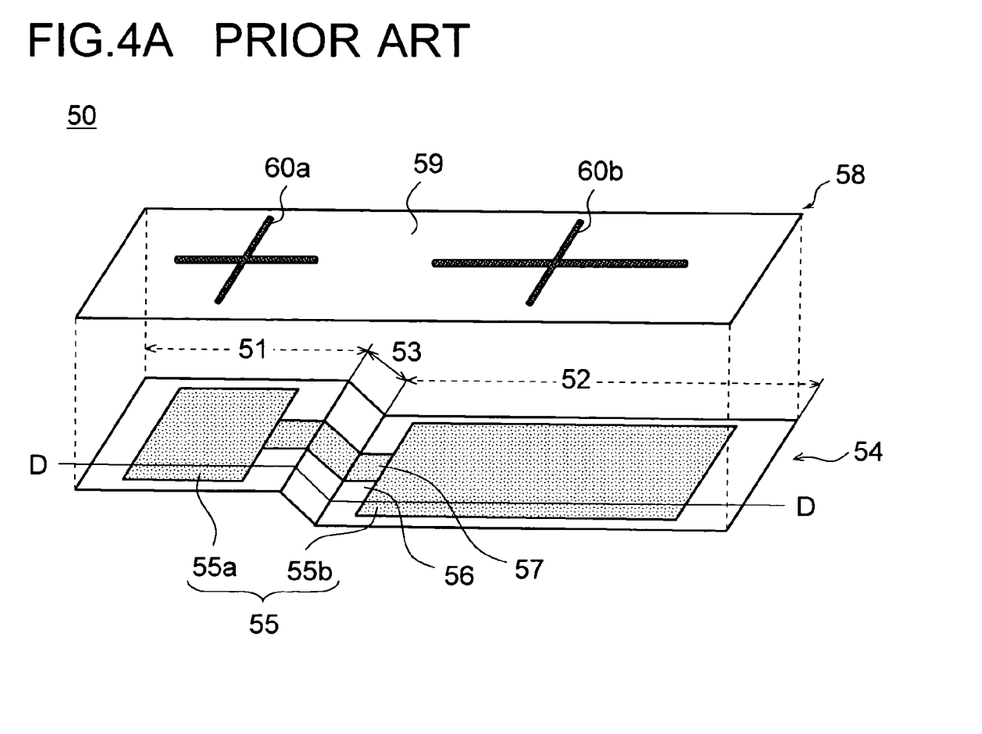
FIG. 4A is a perspective view schematically showing the structure of a conventional MVA semi-transmissive liquid crystal display panel.
Figure 4B:
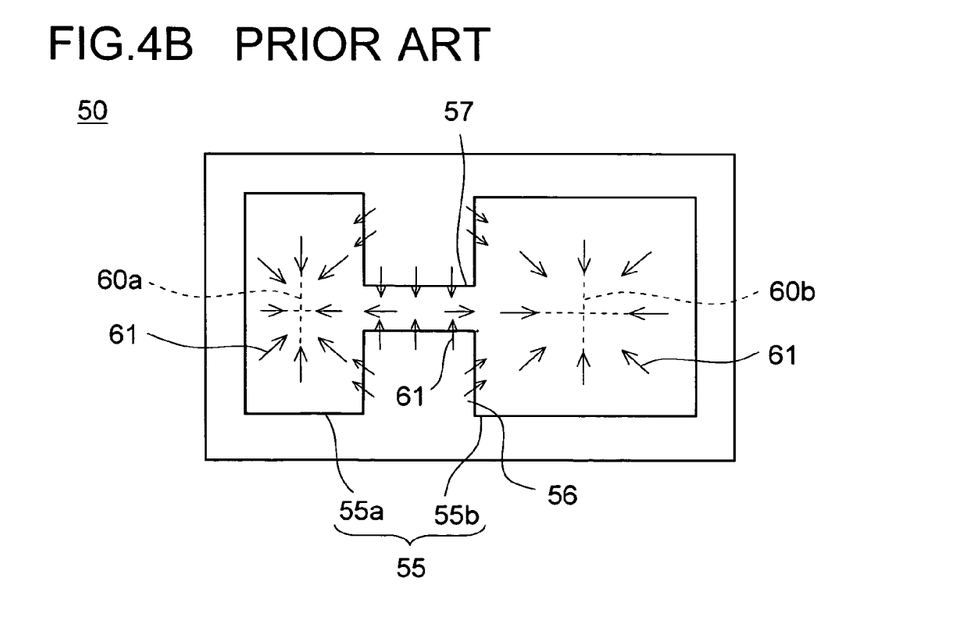
FIG. 4B is a diagram schematically showing how liquid crystals are inclined when an electric field is applied to liquid crystals in a liquid crystal layer.
Figure 5:
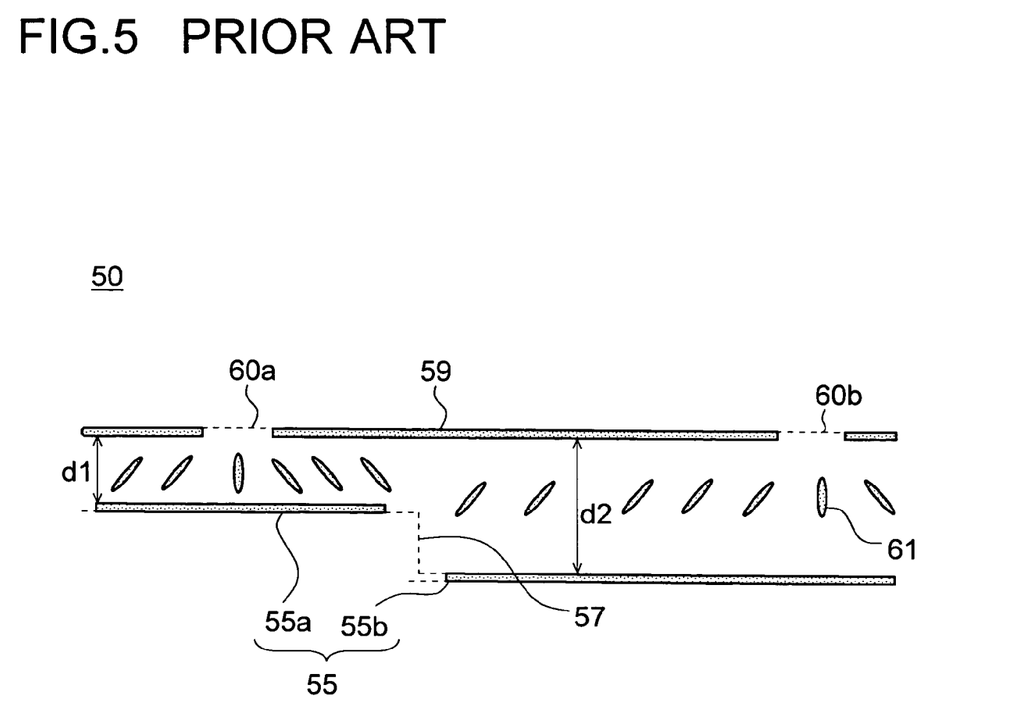
FIG. 5 is a sectional view taken along line D-D shown in FIG. 4A.

Here, an MVA semi-transmissive liquid crystal display panel disclosed in JP-A-2004-069767 will be described with reference to FIGS. 4A, 4B, and 5. FIG. 4A is a perspective view schematically showing the structure of an MVA semi-transmissive liquid crystal display panel 50. FIG. 4B is a diagram schematically showing in which direction liquid crystals are inclined when an electric field is applied to liquid crystals in a liquid crystal layer. FIG. 5 is a sectional view taken along line D-D shown in FIG. 4A.

In this semi-transmissive liquid crystal display panel 50, an inclined plane or a height difference 53 is formed between a reflective portion 51 and a transmissive portion 52, and the reflective portion 51 and the transmissive portion 52 run continuously through the height difference 53 laid in between. The semi-transmissive liquid crystal display panel 50 has a first substrate 54 and a pixel electrode 55 formed thereon, and the pixel electrode 55 includes a first opening region 56, where no pixel electrode 55 is formed. This first opening region 56 constitutes first alignment control means, and is formed so as to be astride the reflective portion 51 and the transmissive portion 52 with the height difference 53 laid in between.

As a result, a pixel electrode 55a formed in the reflective portion 51 and a pixel electrode 55b formed in the transmissive portion 52 are connected to each other via a single line 57 extending in the direction of the length of the semi-transmissive liquid crystal display panel 50.

In a common electrode 59 formed on a second substrate 58, second opening regions 60a and 60b are so formed respectively as to face the pixel electrode 55a formed in the reflective portion 51 and the pixel electrode 55b formed in the transmissive portion 52. These second opening regions 60a and 60b constitute second alignment control means. The second opening regions 60a and 60b are formed as cross-shaped slits, and are arranged in such a way that, in the vertical direction, the center of the second opening region 60a coincides with the center of the pixel electrode 55a and the center of the second opening region 60b coincides with the center of the pixel electrode 55b.

In this semi-transmissive liquid crystal display panel 50, when no electric field is applied between the pixel electrode 55 and the common electrode 59, liquid crystal molecules 61 in the liquid crystal layer are aligned with their long axes perpendicular to the surfaces of the pixel electrode 55 and the common electrode 59, blocking the passage of light. When an electric field is applied to the liquid crystal molecules 61 in the liquid crystal layer, as shown in FIGS. 4B and 5, the ends of the liquid crystal molecules 61, the ends being located on the side of the common electrode 59, are inclined toward the line 57 above the first opening region 56 in the height difference 53, and are inclined toward the center of the reflective portion 51 above the reflective portion 51 and toward the center of the transmissive portion 52 above the transmissive portion 52. This allows the light to pass through. As described above, according to the semi-transmissive liquid crystal display panel 50, the liquid crystal molecules are aligned in a given direction, making it possible to reduce degradation in visual characteristics or response speed.

In the MVA semi-transmissive liquid crystal display panel 50 described above, the height difference 53 is formed between the reflective portion 51 and the transmissive portion 52, which are located on the first substrate 54 side, and thereby, as is well known, a cell gap d1 in the reflective portion 51 and a cell gap d2 in the transmissive portion have the relationship d1=(d2)/2. In this way, adjustment is performed so that the image quality in the reflective portion 51 and the image quality in the transmissive portion 52 are made equal to each other. Such a cell gap adjustment can be performed on the second substrate 58 side, as practiced in another conventionally known type of MVA semi-transmissive liquid crystal display panel.

Figure 6:
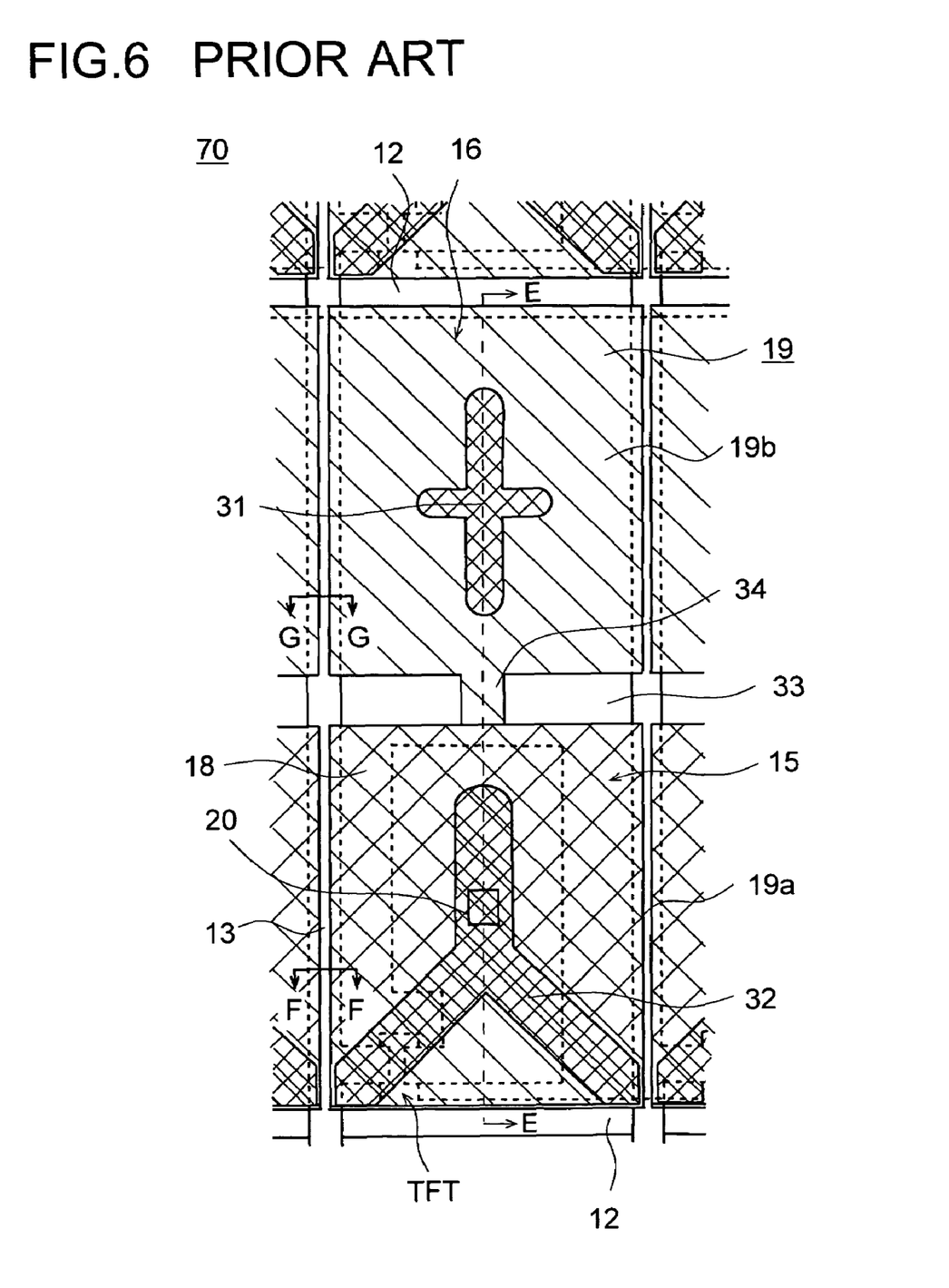
FIG. 6 is a plan view showing one pixel of a conventional semi-transmissive liquid crystal display panel, as seen through a second substrate, in which a topcoat layer for cell gap adjustment is provided on the second substrate side.
Figure 7:
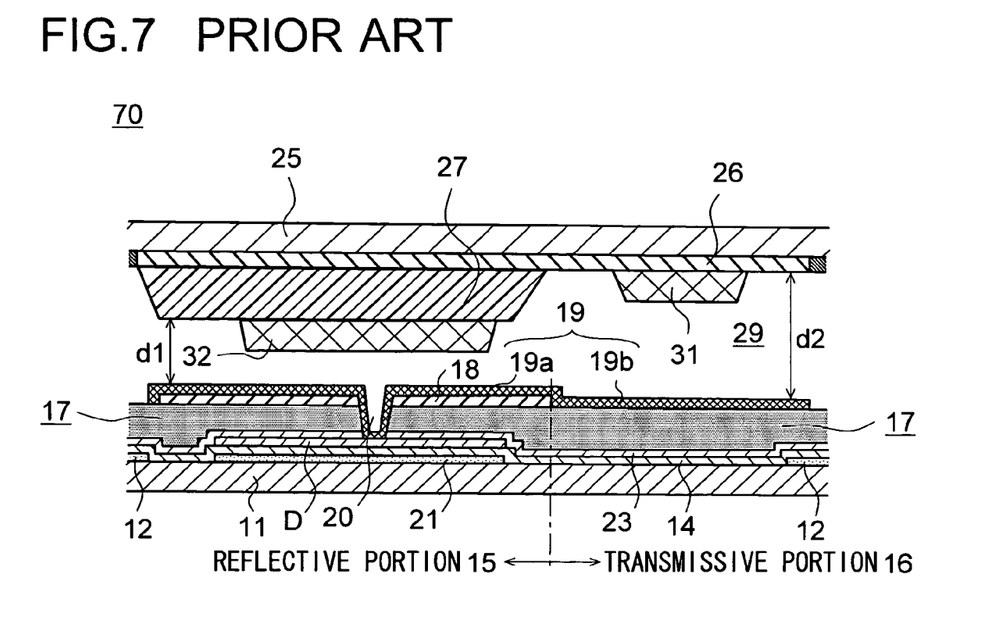
FIG. 7 is a sectional view taken along line E-E shown in FIG. 6.
Figure 8A:
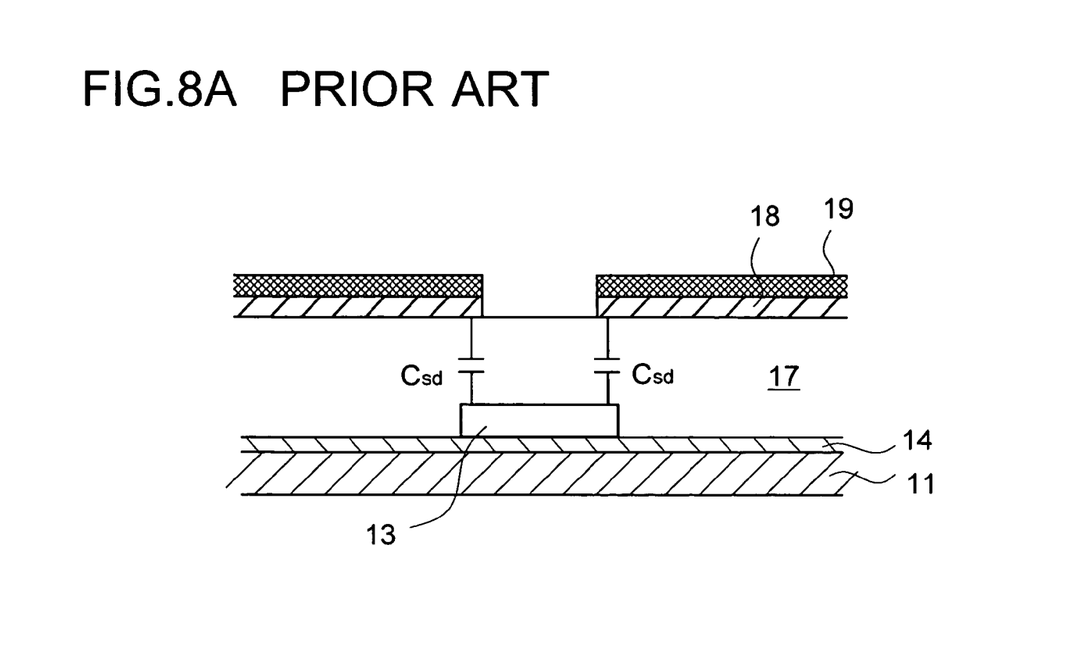
FIG. 8A is a sectional view taken along line F-F shown in FIG. 6.
Figure 8B:
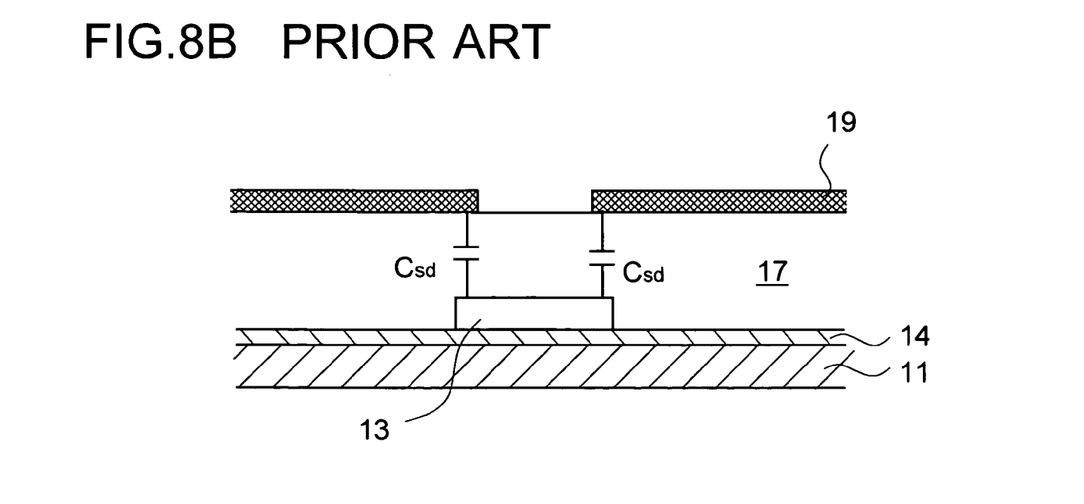
FIG. 8B is a sectional view taken along line G-G shown in FIG. 6.

As another conventional example, an MVA semi-transmissive liquid crystal display panel having a topcoat layer for a cell gap adjustment formed on a second substrate side will be described with reference to FIGS. 6 to 8. FIG. 6 is a plan view showing one pixel of a conventional semi-transmissive liquid crystal display panel having a topcoat layer for a cell gap adjustment formed on a second substrate side, as seen through the second substrate. FIG. 7 is a sectional view taken along line E-E shown in FIG. 6. FIGS. 8A and 8B are sectional views, in which a second substrate is not shown, taken along line F-F and line G-G, respectively, shown in FIG. 6.

In a semi-transmissive liquid crystal display panel 70, a plurality of scan lines 12 and signal lines 13 are arranged so as to form a matrix, directly or via an inorganic insulating film 14, on an insulating transparent glass substrate 11 serving as a first substrate. Here, an area enclosed by the scan and signal lines 12 and 13 corresponds to one pixel, each pixel has a thin-film transistor TFT serving as a switching element, and the surface of the TFT, for example, is coated with a protective insulating film 23.

In a reflective portion 15 and a transmissive portion 16, an interlayer film 17 is laid on top of the scan lines 12, the signal lines 13, the inorganic insulating film 14, and the protective insulating film 23, for example. In the reflective portion 15, the interlayer film 17 is formed of an organic insulating film having fine projections and depressions on the surface thereof, in the transmissive portion 16, the interlayer film 17 is formed of an organic insulating film having a flat surface. Note that, in FIGS. 6 and 7, the projections and depressions formed in the reflective portion 15 are not shown. The interlayer film 17 has a contact hole 20 in a part thereof that corresponds to the drain electrode D of the TFT. In each pixel, the reflective portion 15 has a reflecting layer 18 made of aluminum, for example, formed on the surface of the interlayer film 17. On the surface of this reflecting layer 18 and the surface of the interlayer film 17 formed in the transmissive portion 16, a transparent pixel electrode 19 made of ITO or IZO, for example, is formed.

In the reflective portion 15, an auxiliary capacity line 21 is disposed below the reflecting layer 18 formed on the surface of the interlayer film 17, and the reflecting layer 18 and the pixel electrode 19 are formed in such a way that, as seen in a plan view, they do not abut on a reflecting layer and a pixel electrode of an adjacent pixel and that they slightly overlap the scan line 12 and the signal line 13 for preventing light leakage. Likewise, in the transmissive portion 16, the pixel electrode 19 is formed in such a way that, as seen in a plan view, it does not abut on a pixel electrode and a reflecting layer of an adjacent pixel and that it slightly overlap the scan line 12 and the signal line 13.

In this semi-transmissive liquid crystal display panel 70, a slit 33 is formed in the pixel electrode 19 for controlling the alignment of liquid crystal molecules along the boundary between the reflective portion 15 and the transmissive portion 16. As a result, the pixel electrode 19 is practically divided into two regions: one of which is a pixel electrode 19a formed in the reflective portion 15 and the other is a pixel electrode 19b formed in the transmissive portion 16. The pixel electrode 19a formed in the reflective portion 15 and the pixel electrode 19b formed in the transmissive portion 16 are electrically connected to each other via a smaller-width portion 34. A vertical alignment film (unillustrated) is laid on the surface of the pixel electrode 19 in such a way that all the pixels are coated therewith.

On the other hand, on the display region of an insulating transparent glass substrate 25 serving as a second substrate, a stripe-shaped color filter layer 26 having a color corresponding to each pixel, that is, one of three colors: red (R), green (G), or blue (B), is formed. Here, the thickness of the color filter layer 26 is uniform in the reflective portion 15 and the transmissive portion 16, and the color filter layer 26 has a topcoat layer 27 having a predetermined thickness in a part thereof that corresponds to the reflective portion 15. The topcoat layer 27 is formed over the entire length and breadth of the reflective portion 15, and the thickness thereof is adjusted so that the thickness of a layer of liquid crystals 29 in the reflective portion 15, i.e., the cell gap d1 is half the thickness of the cell gap d2 in the transmissive portion 16, that is, d1=(d2)/2.

In addition, protrusions 31 and 32 for controlling the alignment of the liquid crystals are formed respectively on the part of the surface of the color filter layer 26 located in the transmissive portion 16 and on the part of the surface of the topcoat layer 27 located in the reflective portion 15. On the surfaces of the color filter layer 26, the topcoat layer 27, and the protrusions 31 and 32, a common electrode (unillustrated) and a vertical alignment film (unillustrated) are laid on top of another.

The first substrate and the second substrate are then located face-to-face, and then bonded together by means of a sealing member provided around them. Then, a space between the substrates is filled with liquid crystals 29 with negative dielectric anisotropy. In this way, the MVA semi-transmissive liquid crystal display panel 70 is obtained. Although not shown in the figure, a conventionally known backlight provided with a light source, a light guide plate, and a diffusing sheet, for example, is disposed below the first substrate.

In the MVA semi-transmissive liquid crystal display panel 70 described above, when no electric field is applied between the pixel electrode 19 and the common electrode, the liquid crystal molecules in the liquid crystal layer are aligned with their long axes perpendicular to the surfaces of the pixel electrode and the common electrode, blocking the passage of light; when an electric field is applied between the pixel electrode and the common electrode, the light is allowed to pass through. This reduces the influence of light leakage occurring in the transmissive portion on the image quality. Furthermore, the presence of the slit 33 formed in the pixel electrode 19 and the protrusions 31 and 32 makes the liquid crystal molecules inclined toward the protrusion 31 or 32, greatly improving the viewing angle.

In the MVA semi-transmissive liquid crystal display panel 70 described above, to prevent light leakage, the pixel electrode 19b is formed in the transmissive portion 16 in such a way that it does not abut on a pixel electrode and a reflecting layer of an adjacent pixel and that it slightly overlaps the scan line 12 and the signal line 13. Likewise, the reflecting layer 18 and the pixel electrode 19a are formed in the reflective portion 15 in such a way that they do not abut on a reflecting layer and a pixel electrode of an adjacent pixel and that they slightly overlap the scan line 12 and the signal line 13 for preventing light leakage.

Figure 9:
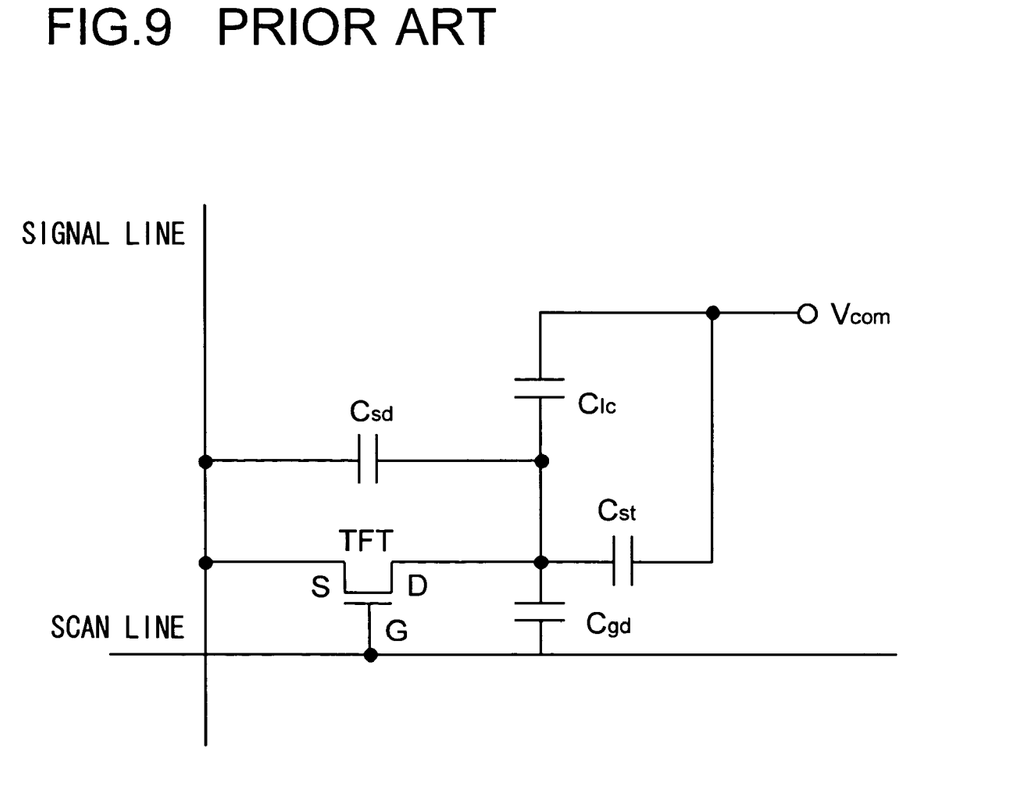
FIG. 9 is diagram showing an equivalent circuit of one pixel of a liquid crystal display panel.

As described above, when the pixel electrode 19 is formed along the signal line 13 so as to overlap it as seen in a plan view, capacitance Csd is produced between the signal line 13 and the pixel electrode 19 as shown in FIGS. 8A and 8B, which are sectional views taken along line F-F and line G-G, respectively, shown in FIG. 6. As seen in FIG. 9 showing an equivalent circuit of one pixel, the capacitance Csd is parasitic capacitance produced in parallel between the drain and source electrodes of the TFT. When the capacitance Csd is equal to or greater than a predetermined value, crosstalk occurs on the display screen as the liquid crystal display device is driven. Thus, by reducing the capacitance Csd, that is, by reducing the width of the space where the signal line and the pixel electrode overlap one another, it is possible to reduce crosstalk.

Now, in the MVA semi-transmissive liquid crystal display panel 70 described above, when no electric field is applied between the pixel electrode 19 and the common electrode, the liquid crystal molecules in the liquid crystal layer are aligned with their long axes perpendicular to the surfaces of the pixel electrode and the common electrode, blocking the passage of light. This should prevent leakage of light. Thus, to reduce the capacitance Csd produced between the signal line 13 and the pixel electrode 19 and furthermore to obtain a semi-transmissive liquid crystal display panel with high aperture ratio, the pixel electrode 19 can be so formed along the scan line 12 and the signal line 13 as not to overlap them as seen in a plan view.

However, the inventors of the present invention have found out by experiments that, when the pixel electrode 19 is so formed along the scan line 12 and the signal line 13 as not to overlap them as seen in a plan view, light leaks between the pixel electrode 19b formed in the transmissive portion 16 and the scan line 12, leading to reduction in contrast in a display image.

The reason is considered to be as follows. Scanning signals are sequentially inputted to the scan line 12 frame by frame, and, even when no scanning signal is inputted thereto, a given voltage is normally applied to the scan line 12. At this time, since the scan line 12 is exposed as seen in a plan view, a potential difference is produced between the scan line 12 and the common electrode. This makes the liquid crystal molecules existing near the scan line 12 inclined all the time, resulting in light leakage. Similar problems arise in a VA semi-transmissive liquid crystal display panel that is provided with a pixel electrode having no slit and a second substrate having no alignment control means for controlling the alignment of liquid crystals.

SUMMARY OF THE INVENTION

In view of the conventionally experienced problems described above, it is an object of the present invention to provide a VA or MVA semi-transmissive liquid crystal display panel that suffers less from flicker and crosstalk, and that can offer a bright display with good contrast.

To achieve the above object, according to the present invention, a semi-transmissive liquid crystal display panel is provided with: a first substrate divided into sections by signal lines and scan lines arranged so as to form a matrix, each section having a transmissive portion and a reflective portion, each section having a pixel electrode located in the transmissive portion or in the transmissive and reflective portions, each section having a reflecting layer located in the reflective portion; a second substrate having a common electrode formed on the surface thereof; a vertical alignment film laid on top of the first and second substrates; and a liquid crystal layer with negative dielectric anisotropy disposed between the first and second substrates. Here, the pixel electrode overlaps the scan lines in the transmissive portion, as seen in a plan view, and has jutting portions near where the signal lines and the scan lines intersect.

With this structure, the pixel electrode located on the transmissive portion side partly overlaps the scan line, as seen in a plan view. Thus, even when a potential difference produced between the scan line and a common electrode makes liquid crystal molecules existing near the scan line inclined all the time, its effects can be efficiently suppressed by the pixel electrode. This makes it possible to obtain a VA or MVA semi-transmissive liquid crystal display panel that suffers less from crosstalk and that offers bright display with wide viewing angle and high contrast.

It is to be noted that practically the same advantages can be obtained regardless of whether or not there is a gap between the pixel electrode and the signal line, as seen in a plan view.

Here, the pixel electrode and the reflecting layer are formed on an interlayer insulating film formed over the entire display region of the first substrate, and a topcoat layer is formed on the second substrate in a part thereof corresponding to the reflective portion.

With this structure, even when, for example, a mask is displaced at the time of formation of the pixel electrode, it is possible to prevent the scan line from being exposed and thereby affecting the alignment of the liquid crystal molecules. This makes it possible to more reliably obtain a VA or MVA semi-transmissive liquid crystal display panel that suffers less from crosstalk and that offers brightness, a wide viewing angle, and high contrast.

Here, the pixel electrode formed in the transmissive portion is divided into a plurality of regions by a slit.

With this structure, even when, for example, a mask is displaced at the time of formation of the pixel electrode, it is possible to prevent the scan line from being exposed and thereby affecting the alignment of the liquid crystal molecules. This makes it possible to more reliably obtain a VA or MVA semi-transmissive liquid crystal display panel that suffers less from crosstalk and that offers bright display with wide viewing angle and high contrast.

Here, the pixel electrode has a slit between the reflective portion and the transmissive portion, and the second substrate has alignment control means at least in a part thereof that corresponds to the transmissive portion.

With this structure, even when, for example, a mask is displaced at the time of formation of the pixel electrode, it is possible to prevent the scan line from being exposed and thereby affecting the alignment of the liquid crystal molecules. This makes it possible to more reliably obtain a VA or MVA semi-transmissive liquid crystal display panel that suffers less from crosstalk and that offers brightness, a wide viewing angle, and high contrast. Furthermore, since the pixel electrode overlaps both the scan line and the signal line only in the jutting portions, the pixel electrode does not overlaps the signal line other than the jutting portions. This helps reduce crosstalk.

Here, the jutting portions each overlap the scan line in a width of at least of 1.5 µm.

With this structure, since the jutting portions each overlap the scan line in a width of at least of 1.5 µm, even when, for example, a mask is displaced in the direction of the scan line or the signal line at the time of formation of the pixel electrode, it is possible to prevent the scan line from being exposed. This makes it possible to obtain the above-described advantage more reliably.

Here, the jutting portions each overlap the signal line in a width of at least of 1.5 µm.

With this structure, since the jutting portions each overlap the signal line in a width of 1.5 µm, even when, for example, a mask is displaced in the direction of the scan line or the signal line at the time of formation of the pixel electrode, it is possible to prevent the scan line from being exposed. This makes it possible to obtain the above-described advantage more reliably.

Here, the pixel electrode and the reflecting layer are formed on an interlayer insulating film formed over the entire display region of the first substrate, and a topcoat layer is formed on the second substrate in a part thereof corresponding to the reflective portion.

With this structure, since the surface of the interlayer film formed on the first substrate is planarized, the surfaces of the pixel electrode and the reflecting layer formed on the surface of the interlayer film can also be planarized. This reduces disturbance in the alignment of the liquid crystal molecules, and the topcoat layer makes it easy to set a cell gap in the reflective portion at a predetermined value. As a result, it is possible to obtain a VA or MVA semi-transmissive liquid crystal display panel that offers high contrast and satisfactory image quality.

Here, the pixel electrode formed in the transmissive portion is divided into a plurality of regions by a slit.

With this structure, even when the pixel electrode formed in the transmissive portion is large in area, it is divided into a plurality of pixel electrodes so that each pixel electrode has a desired area, and alignment control means are provided one for each pixel electrode. This helps reduce disturbance in the alignment of the liquid crystal molecules over the entire transmissive portion. As a result, it is possible to obtain an MVA semi-transmissive liquid crystal display panel that offers a wide viewing angle, high contrast, and satisfactory image quality.

Here, the pixel electrode has a slit between the reflective portion and the transmissive portion, and the second substrate has alignment control means at least in a part thereof that corresponds to the transmissive portion.

With this structure, the alignment control means with a simple structure provides an MVA semi-transmissive liquid crystal display panel that offers a wide viewing angle and fast response speed.

DETAILED DESCRIPTION OF PREFERRED EMBODIMENTS

Hereinafter, embodiments of the present invention will be described specifically with reference to the accompanying drawings. It should be understood, however, that the embodiments presented below are simply intended to give an example of a semi-transmissive liquid crystal display panel that embodies the technical idea of the present invention, and therefore the semi-transmissive liquid crystal display panel specifically described below is not intended to limit in any way the manner in which to carry out the present invention. That is, the present invention finds wide application in the technical fields to which the appended claims are directed.

Figure 1:
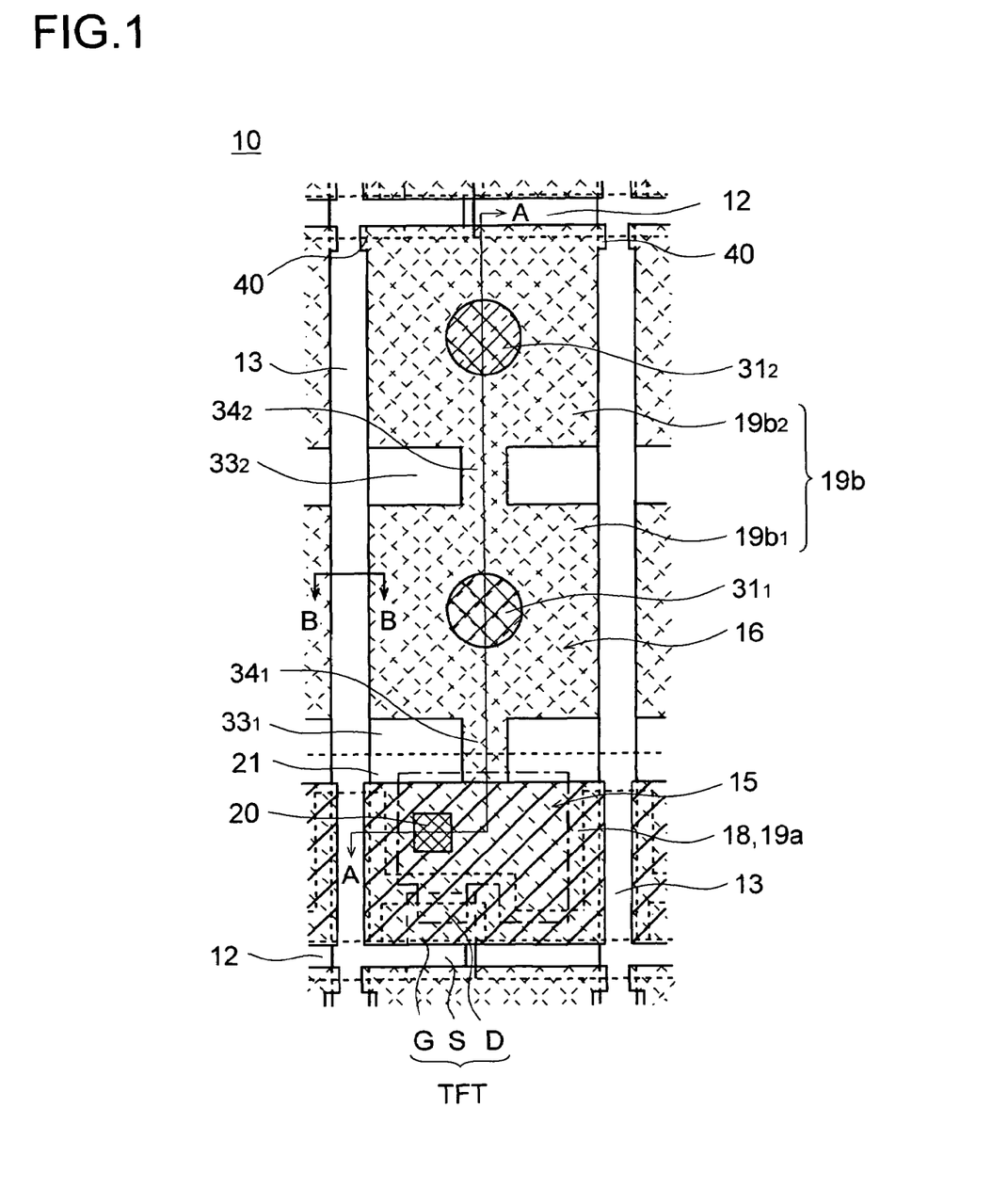
FIG. 1 is a plan view showing one pixel of the MVA semi-transmissive liquid crystal display panel embodying the invention, as seen through the second substrate.
Figure 2A:
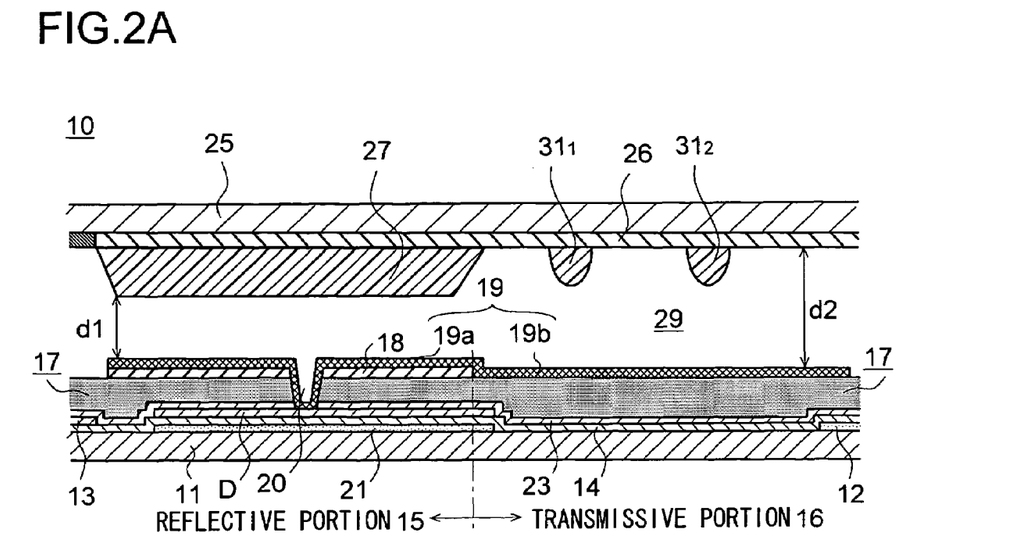
FIG. 2A is a sectional view taken along line A-A shown in FIG. 1.
Figure 2B:
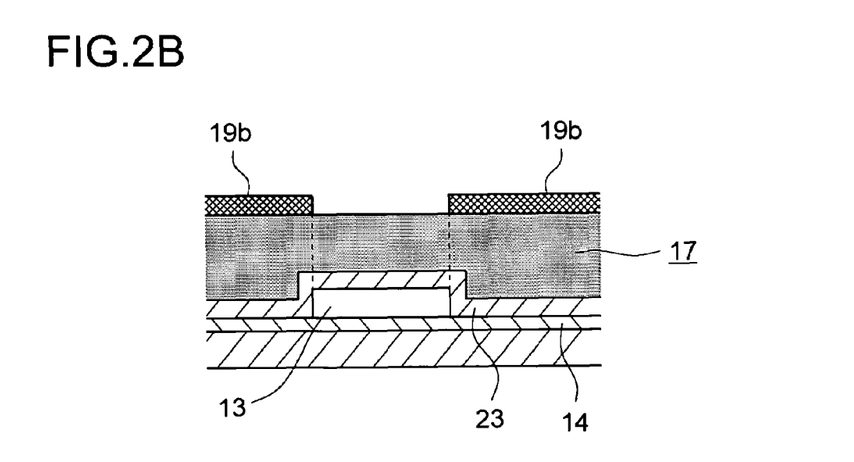
FIG. 2B is a sectional view, in which the second substrate is not shown, taken along line B-B shown in FIG. 1.

A semi-transmissive liquid crystal display panel 10 embodying the present invention will be described with reference to FIGS. 1, 2A, and 2B. FIG. 1 is a plan view showing one pixel of the MVA semi-transmissive liquid crystal display panel embodying the present invention, as seen through the second substrate, FIG. 2A is a sectional view taken along line A-A shown in FIG. 1, and FIG. 2B is a sectional view, in which the second substrate is not shown, taken along line B-B shown in FIG. 1. In the following description, such members as are found also in a conventional MVA semi-transmissive liquid crystal display panel 70 shown in FIGS. 6 and 7 will be identified with common reference characters.

In the MVA semi-transmissive liquid crystal display panel 10, a plurality of scan lines 12 and signal lines 13 are arranged so as to form a matrix, directly or via an inorganic insulating film 14, on an insulating transparent glass substrate 11 serving as a first substrate. Here, an area enclosed by the scan and signal lines 12 and 13 corresponds to one pixel, each pixel has a TFT (thin film transistor) serving as a switching element, and the surface of the TFT, for example, is coated with a protective insulating film 23.

In a reflective portion 15 and a transmissive portion 16, an interlayer film 17 is laid on top of the scan lines 12, the signal lines 13, the inorganic insulating film 14, and the protective insulating film 23, for example. In the reflective portion 15, the interlayer film 17 is formed of an organic insulating film such as a photoresist having fine projections and depressions on the surface thereof; in the transmissive portion 16, the interlayer film 17 is formed of an organic insulating film such as a photoresist having a flat surface. Note that, in FIGS. 1, 2A, and 2B, the projections and depressions formed in the reflective portion 15 are not shown. The interlayer film 17 has a contact hole 20 in a part thereof that corresponds to the drain electrode D of the TFT. In each pixel, the reflective portion 15 has a reflecting layer 18 made of aluminum, for example, formed on the surface of the interlayer film 17. On the surface of this reflecting layer 18 and the surface of the interlayer film 17 formed in the transmissive portion 16, a transparent pixel electrode 19 made of ITO (indium tin oxide) or IZO (indium zinc oxide), for example, is formed and electrically connected to the drain electrode D of the TFT via the contact hole 20.

In this semi-transmissive liquid crystal display panel 10, a slit $33_1$ is formed in the pixel electrode 19 for controlling the alignment of liquid crystal molecules along the boundary between the reflective portion 15 and the transmissive portion 16. As a result, the pixel electrode 19 is practically divided into two regions: one of which is a pixel electrode 19a formed in the reflective portion 15 and the other is a pixel electrode 19b formed in the transmissive portion 16. The pixel electrode 19a formed in the reflective portion 15 and the pixel electrode 19b formed in the transmissive portion 16 are electrically connected to each other via a smaller-width portion $34_1$.

In the reflective portion 15, an auxiliary capacity line 21 is disposed below the reflecting layer 18 formed on the interlayer film 17, and the reflecting layer 18 and the pixel electrode 19a formed in the reflective portion 15 are formed in such a way that, as seen in a plan view, they do not abut on a reflecting layer and a pixel electrode of an adjacent pixel and that they overlap the scan line 12 and the signal line 13. Furthermore, the reflecting layer 18 and the pixel electrode 19a formed in the reflective portion 15 are formed to be practically identical in shape so that one completely overlaps the other. On the other hand, the pixel electrode 19b formed in the transmissive portion 16 is formed, along the signal line 13, in such a way that it does not abut on a pixel electrode and a reflecting layer of an adjacent pixel, that it does not practically overlap the signal line 13, and that it slightly overlaps the scan line 12. When the width of the space where the pixel electrode 19b overlaps the scan line 12 is at least 1.5 μm, it is possible to achieve the advantage of the present invention. In this embodiment, the pixel electrode 19b formed in the transmissive portion 16 has a portion where it overlaps the scan line 12, and this portion has, at two ends 40 thereof, jutting portions jutting into the signal line 13 in such a way as to overlap the signal line 13. By doing this, even when, for example, a mask is displaced at the time of formation of the pixel electrode 19, it is possible to prevent the scan line 12 from being exposed, affecting the alignment of the liquid crystal molecules. When the jutting portions formed at the ends 40 each overlap the signal line 13 in a width of at least 1.5 μm, the scan line 12 can be prevented from being exposed even when, for example, a mask is displaced.

Incidentally, in the semi-transmissive liquid crystal display panel 10 of this embodiment, the pixel electrode 19b formed in the transmissive portion 16 is made larger than the pixel electrode 19a formed in the reflective portion 15, and is divided into two regions $19b_1$, and $19b_2$ by a slit $33_2$ formed in the middle thereof. These two regions $19b_1$, and $19b_2$ are electrically connected to each other via a smaller-width portion $34_2$. A vertical alignment film (unillustrated) is laid on the surface of the first substrate including the surface of the pixel electrode 19 in such a way that the entire display region is coated therewith.

One of the reasons that the pixel electrode 19b formed in the transmissive portion 16 is made larger and is divided into two regions $19b_1$, and $19b_2$ is that semi-transmissive liquid crystal display panels used nowadays in mobile phones or the like, having achieved high definition and been used for displaying images, are increasingly used practically as a transmissive liquid crystal display panel by keeping the backlight on all the time. The other is to make it possible to control the alignment of liquid crystal molecules all over the large pixel electrode 19b formed in the transmissive portion.

On the other hand, on the display region of an insulating transparent glass substrate 25 serving as a second substrate, a stripe-shaped color filter layer 26 having a color corresponding to each pixel, that is, one of three colors: red (R), green (G), or blue (B), is formed. Here, the thickness of the color filter layer 26 is uniform in the reflective portion 15 and the transmissive portion 16, and the color filter layer 26 has a topcoat layer 27 having a predetermined thickness in a part thereof that corresponds to the reflective portion 15. The topcoat layer 27 is formed over the entire length and breadth of the reflective portion 15, and the thickness thereof is adjusted so that the thickness of a layer of liquid crystals 29 in the reflective portion 15, i.e., a cell gap d1 is half the thickness of a cell gap d2 in the transmissive portion 16, that is, d1= (d2)/2.

Additionally, the color filter layer 26 located in the transmissive portion 16 has, in part of the surface thereof, bullet-shaped protrusions $31_1$ and $31_2$ for controlling the alignment of the liquid crystal molecules. The protrusions $31_1$ and $31_2$ are respectively located at the centers of the two regions $19b_1$ and $19b_2$ of the pixel electrode 19b formed in the transmissive portion 16. On the surfaces of the color filter layer 26, the topcoat layer 27, and the protrusions $31_1$ and $31_2$, a common electrode (unillustrated) and a vertical alignment film (unillustrated) are laid on top of another.

The first substrate and the second substrate are then located face-to-face, and then bonded together by means of a sealing member provided around them. Then, a space between the substrates is filled with liquid crystals 29 with negative dielectric anisotropy. In this way, the MVA semi-transmissive liquid crystal display panel 10 is obtained. Although not shown in the figure, a conventionally known backlight provided with a light source, a light guide plate, and a diffusing sheet, for example, is disposed below the first substrate.

According to the MVA semi-transmissive liquid crystal display panel 10 structured as described above, the pixel electrode 19 formed in the transmissive portion does not overlap the signal line 13, as seen in a plan view, making it possible to reduce the capacitance Csd to be produced between the signal line 13 and the pixel electrode 19. This helps reduce crosstalk caused by the capacitance Csd. Furthermore, the pixel electrode 19b formed in the transmissive portion 16 has a portion where it overlaps the scan line 12, as seen in a plan view, and this portion has, at two ends 40 thereof, jutting portions jutting into the signal line 13 in such a way as to overlap the signal line 13. This prevents light leakage caused by disturbance in the alignment of the liquid crystal molecules resulting from a voltage applied to the scan line 12. As a result, it is possible to obtain an MVA semi-transmissive liquid crystal display panel with good contrast. Furthermore, in particular, since the signal line and the pixel electrode do not have to overlap one another, as seen in a plan view, as in the conventional example, it is possible to make the signal line narrower than that used in the conventional example. This helps increase the aperture ratio, making it possible to obtain a brighter MVA semi-transmissive liquid crystal display panel.

The embodiment described above deals with an example in which the semi-transmissive liquid crystal display panel 10 is provided with the protrusions $31_1$ and $32_2$ as alignment control means formed in the second substrate; however, it is also possible to use a slit formed in the common electrode as alignment control means. Furthermore, the embodiment described above deals with an example in which the semi-transmissive liquid crystal display panel 10 has alignment control means only in the transmissive portion 16; however, it is also possible to form alignment control means also in the reflective portion 15. Also in this case, it is possible to use a protrusion or a slit formed in the common electrode as alignment control means.

Incidentally, in an MVA semi-transmissive liquid crystal display panel, light does not pass through a liquid crystal layer as long as liquid crystal molecules are vertically aligned when no electric field is applied thereto. Thus, since a vertical alignment film is also formed above the slits $33_1$ and $33_2$ formed in the pixel electrode 19, light does not pass through the portions where these slits are formed. It is for this reason that, to increase the auxiliary capacity of the MVA semi-transmissive liquid crystal display panel 10 of this embodiment, the auxiliary capacity line 21 extends from under the reflecting layer 18 to the side of the slit $33_1$ located on the transmissive portion 16 side.

Figure 3A:
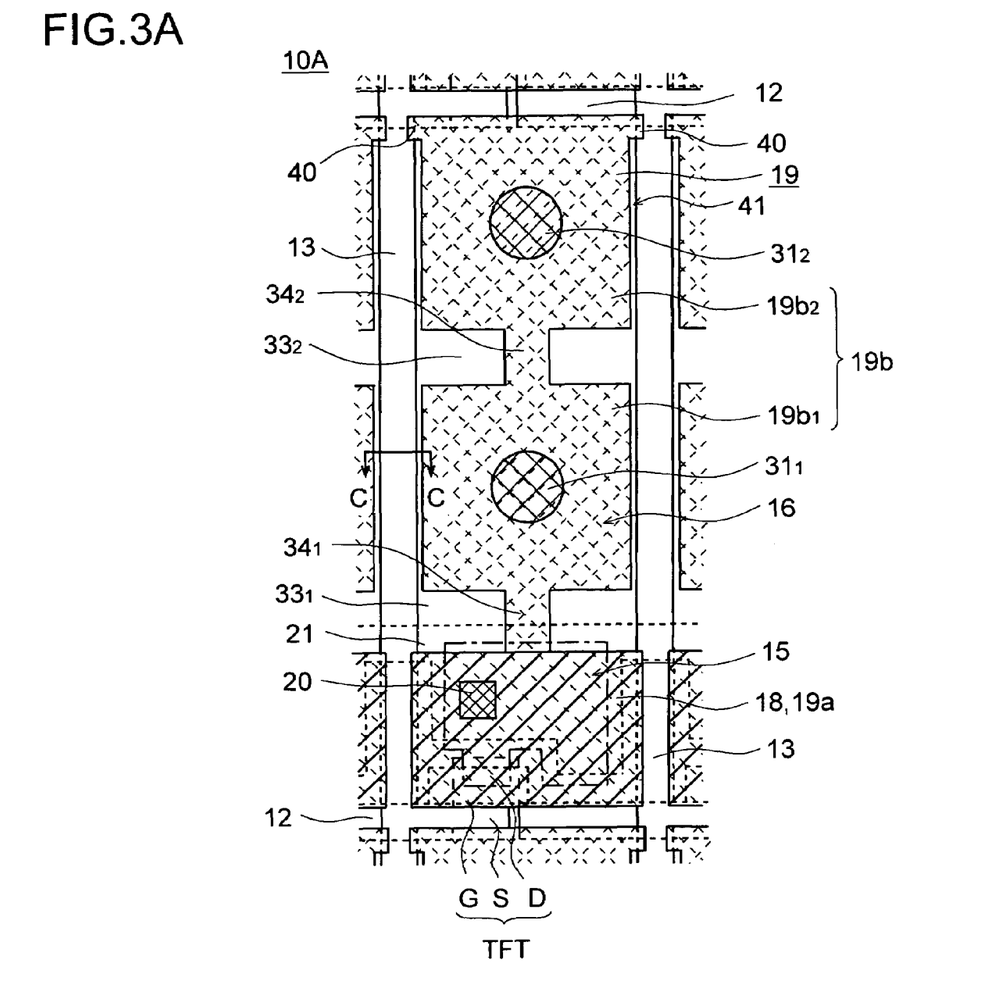
FIG. 3A is a diagram showing a modified example of the MVA semi-transmissive liquid crystal display panel shown in FIG. 1.
Figure 3B:
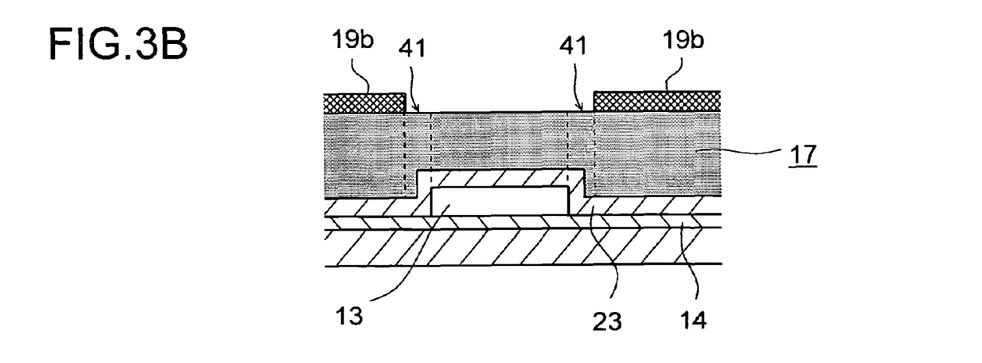
FIG. 3B is a sectional view taken along line C-C shown in FIG. 3A.

The embodiment described above deals with an example in which, in the MVA semi-transmissive liquid crystal display panel 10, the pixel electrode 19b located on the transmissive portion 16 side is formed along the signal line 13 in such a way that it does not practically overlap the signal line 13. It should be understood, however, since it is technically difficult to form the pixel electrode 19b located on the transmissive portion 16 side precisely along the signal line 13, that there may be a slight gap 41 between the pixel electrode 19b located on the transmissive portion side and the scan line 13 as in a semi-transmissive liquid crystal display panel 10A shown in FIG. 3, which is a modified example of the MVA semi-transmissive liquid crystal display panel 10. Here, FIG. 3A is a plan view showing one pixel of the semi-transmissive liquid crystal display panel 10A, as seen through the second substrate, and FIG. 3B is a sectional view taken along line C-C shown in FIG. 3A. Also in this case, since a vertical alignment film is formed above the gap 41, it is possible to prevent light from leaking from the gap 41.

The embodiment described above deals with an MVA semi-transmissive liquid crystal display panel provided with a pixel electrode having a slit and a second substrate having a protrusion as alignment control means in a part thereof that corresponds to a transmissive portion. It is also to be understood, however, that the present invention can be applied to a VA semi-transmissive liquid crystal display panel provided with a pixel electrode having no slit and a second substrate having no alignment control means for controlling the alignment of liquid crystal molecules.

What is claimed is:

1. A semi-transmissive liquid crystal display panel comprising:
   a first substrate divided into sections by signal lines and scan lines arranged so as to form a matrix, each section having a transmissive portion and a reflective portion, each section having a pixel electrode located in the transmissive portion or in the transmissive and reflective portions, each section having a reflecting layer located in the reflective portion;
   a second substrate having a common electrode formed on a surface thereof;
   a vertical alignment film laid on top of the first and second substrates; and
   a liquid crystal layer with negative dielectric anisotropy disposed between the first and second substrates,
   wherein the pixel electrode is formed in the transmissive portion, as seen in a plan view, along the signal line so as not to overlap the signal line and along the scan line so as to overlap the scan line, and
   a jutting portion is formed at each end of a part of the pixel electrode overlapping the scan line along the scan line, the jutting portion jutting from said part into the signal line so as to overlap the signal line.

2. The semi-transmissive liquid crystal display panel of claim 1,
   wherein the jutting portions each overlap the scan line.

3. The semi-transmissive liquid crystal display panel of claim 2,
   wherein the jutting portions each overlap the scan line in a width of at least of 1.5 μm.

4. The semi-transmissive liquid crystal display panel of claim 1,
   wherein the jutting portions each overlap the signal line.

5. The semi-transmissive liquid crystal display panel of claim 4,
   wherein the jutting portions each overlap the signal line in a width of at least of 1.5 μm.

6. The semi-transmissive liquid crystal display panel of claim 1,
   wherein the pixel electrode overlaps both the scan line and the signal line only in the jutting portions.

7. The semi-transmissive liquid crystal display panel of claim 6,
   wherein the pixel electrode overlaps the scan line in a width of at least of 1.5 μm.

8. The semi-transmissive liquid crystal display panel of claim 6,
   wherein the pixel electrode overlaps the signal line in a width of at least of 1.5 μm.

9. The semi-transmissive liquid crystal display panel of claim 1,
   wherein the pixel electrode and the reflecting layer are formed on an interlayer insulating film formed over an entire display region of the first substrate, and
   wherein a topcoat layer is formed on the second substrate in a part thereof corresponding to the reflective portion.

10. The semi-transmissive liquid crystal display panel of claim 2,
    wherein the pixel electrode and the reflecting layer are formed on an interlayer insulating film formed over an entire display region of the first substrate, and
    wherein a topcoat layer is formed on the second substrate in a part thereof corresponding to the reflective portion.

11. The semi-transmissive liquid crystal display panel of claim 3,
    wherein the pixel electrode and the reflecting layer are formed on an interlayer insulating film formed over an entire display region of the first substrate, and
    wherein a topcoat layer is formed on the second substrate in a part thereof corresponding to the reflective portion.

12. The semi-transmissive liquid crystal display panel of claim 4,
    wherein the pixel electrode and the reflecting layer are formed on an interlayer insulating film formed over an entire display region of the first substrate, and
    wherein a topcoat layer is formed on the second substrate in a part thereof corresponding to the reflective portion.

13. The semi-transmissive liquid crystal display panel of claim 5,
    wherein the pixel electrode and the reflecting layer are formed on an interlayer insulating film formed over an entire display region of the first substrate, and
    wherein a topcoat layer is formed on the second substrate in a part thereof corresponding to the reflective portion.

14. The semi-transmissive liquid crystal display panel of claim 6,
    wherein the pixel electrode and the reflecting layer are formed on an interlayer insulating film formed over an entire display region of the first substrate, and
    wherein a topcoat layer is formed on the second substrate in a part thereof corresponding to the reflective portion.

15. The semi-transmissive liquid crystal display panel of claim 7,
    wherein the pixel electrode and the reflecting layer are formed on an interlayer insulating film formed over an entire display region of the first substrate, and
    wherein a topcoat layer is formed on the second substrate in a part thereof corresponding to the reflective portion.

16. The semi-transmissive liquid crystal display panel of claim 8, wherein the pixel electrode and the reflecting layer are formed on an interlayer insulating film formed over an entire display region of the first substrate, and wherein a topcoat layer is formed on the second substrate in a part thereof corresponding to the reflective portion.

17. The semi-transmissive liquid crystal display panel of claim 16, wherein the pixel electrode formed in the transmissive portion is divided into a plurality of regions by a slit.

18. The semi-transmissive liquid crystal display panel of claim 17, wherein the pixel electrode has a slit between the reflective portion and the transmissive portion, and wherein the second substrate has alignment control means at least in a part thereof that corresponds to the transmissive portion.

* * * * *